US011348367B2

(12) United States Patent
Stivers et al.

(10) Patent No.: US 11,348,367 B2
(45) Date of Patent: May 31, 2022

(54) SYSTEM AND METHOD OF BIOMETRIC IDENTIFICATION AND STORING AND RETRIEVING SUSPECT INFORMATION

(71) Applicants: Joshua A. Stivers, Puyallup, WA (US); Stephen D. Pansini, Puyallup, WA (US)

(72) Inventors: Joshua A. Stivers, Puyallup, WA (US); Stephen D. Pansini, Puyallup, WA (US)

(73) Assignee: Homeland Patrol Division Security, LLC, Puyallup, WA (US)

( * ) Notice: Subject to any disclaimer, the term of this patent is extended or adjusted under 35 U.S.C. 154(b) by 8 days.

(21) Appl. No.: 16/726,569

(22) Filed: Dec. 24, 2019

(65) Prior Publication Data

US 2020/0210684 A1 Jul. 2, 2020

Related U.S. Application Data

(60) Provisional application No. 62/785,974, filed on Dec. 28, 2018.

(51) Int. Cl.
| | |
|---|---|
| *G06K 9/00* | (2022.01) |
| *G06V 40/16* | (2022.01) |
| *G06F 16/787* | (2019.01) |
| *G06F 16/738* | (2019.01) |
| *G06V 10/44* | (2022.01) |
| *G06V 20/52* | (2022.01) |

(52) U.S. Cl.
CPC ......... *G06V 40/172* (2022.01); *G06F 16/738* (2019.01); *G06F 16/787* (2019.01); *G06V 10/443* (2022.01); *G06V 20/52* (2022.01); *G06V 40/171* (2022.01); *G06V 40/179* (2022.01)

(58) Field of Classification Search
None
See application file for complete search history.

(56) References Cited

U.S. PATENT DOCUMENTS

| | | | |
|---|---|---|---|
| 9,699,401 B1* | 7/2017 | Jones | H04N 21/25841 |
| 2010/0111377 A1* | 5/2010 | Monroe | G08B 13/1965 |
| | | | 382/118 |
| 2014/0294257 A1 | 10/2014 | Tussy | |
| 2016/0019665 A1* | 1/2016 | Collier | G06F 16/93 |
| | | | 705/40 |
| 2016/0042767 A1 | 2/2016 | Araya et al. | |
| 2016/0182850 A1 | 6/2016 | Thompson | |

(Continued)

OTHER PUBLICATIONS

U.S. Appl. No. 11/705,661, filed Nov. 4, 2007, Kashiwa et al.

(Continued)

*Primary Examiner* — Delomia L Gilliard
(74) *Attorney, Agent, or Firm* — Christopher Mayle; Bold IP, PLLC

(57) ABSTRACT

A system and method for suspect identification, the computer implemented method including a digital catalogue for users to captured images of suspects whereby the captured images are then compared to existing images having identifying information to identify the suspect. The system also presents to a user "a no trespass" statement containing applicable laws prohibiting unlawful trespass that may be read to a suspect whereby the audio and video of the reading may be captured and stored in the system.

13 Claims, 12 Drawing Sheets

(56) References Cited

U.S. PATENT DOCUMENTS

| | | | | |
|---|---|---|---|---|
| 2017/0318446 A1* | 11/2017 | Lee | ............... | H04W 4/02 |
| 2018/0068173 A1* | 3/2018 | Kolleri | ............... | G06F 16/29 |
| 2020/0020356 A1* | 1/2020 | Smith | ............... | G11B 19/18 |
| 2020/0143155 A1* | 5/2020 | Hodge | ............... | G06K 9/00771 |
| 2020/0327315 A1* | 10/2020 | Mullins | ............... | G06K 9/00771 |

OTHER PUBLICATIONS

Tucker, Patrick, "Facial Recognition Coming to Police Body Cameras," Defense One, Jul. 17, 2017. https://www.defenseone.com/technology/2017/07/facial-recognition-coming-police-body-cameras/139472/ accessed Nov. 26, 2018.

* cited by examiner

SYSTEM AND METHOD OF BIOMETRIC IDENTIFICATION AND STORING AND RETRIEVING SUSPECT INFORMATION

CROSS REFERENCE TO RELATED APPLICATIONS

This application is a non-provisional application which claims priority to U.S. Provisional Application No. 62/785,974 filed on Dec. 28, 2018, which is incorporated by reference in its entirety.

FIELD OF THE DISCLOSURE

This disclosure relates generally to the field of information systems which provide data over a computer network and in particular to a real time system and method for determining if a suspect is known using facial recognition to obtain information regarding the person and storing suspect information.

BACKGROUND

The Department of Homeland Security explains that the prompt and detailed reporting of suspicious activities can help prevent violent crimes or terrorist attacks. If somebody sees suspicious activity, they should report it to the local authorities who can then respond quickly. Even with modern technology and advancements with data storage and the internet, it remains relatively difficult for law enforcement or private security to quickly identify perpetrators or suspects. Further, not only is it difficult to identify the suspect, it is difficult to identify repeat offenders who could pose additional risk. Typically, to identify a suspect, law enforcement must rely on their extensive network that includes other police officers and databases that contain the personal information of known suspects and repeat offenders. This information can include a suspect's fingerprints, tattoos, pictures, and other information only accessible to law enforcement.

However, the process of retrieving suspect information can be very time consuming and costly. The process often involves an officer having to bring a suspect to the police station to identify the suspect, or relaying information to other officers and police support staff to look up the suspect's information. Further, many private security firms do not have access to police databases or the funds to support a large staff.

Law enforcement, private security, and loss prevention departments must spend a significant amount of time and effort on assessing and identifying the threat level of unidentified suspects. Thus, a way to quickly identify a suspect and access and update a suspect's personal information is needed.

SUMMARY

The disclosure presented herein relates to a suspect identification system comprising, one or more databases coupled via a network, one or more processors coupled to the one or more databases; and at least one computing device coupled to the one or more processors and the one or more databases via the network, wherein the one or more processors are configured to: generate suspect facial data from an image of a suspect captured on a user's computing device; receive the suspect facial data transmitted from the user's computing device; perform facial recognition processing on the suspect facial data to establish suspect facial recognition data; compare the suspect facial recognition data to pre-existing information stored in a database to identify a suspect match; if a positive determination is made regarding the suspect match, transmit the personal information of an identified suspect; and if a negative determination is made regarding the suspect match, transmit that no match is found, display a trespass statement on a user interface of the user's computing device, store an audio recording of the user reading to the suspect the displayed trespass statement, create an incident report, the incident report comprising the suspect facial recognition data and details related to the incident, to store the incident report and the recorded trespass statement in the one or more databases, wherein the content of the displayed trespass statement is determined by the location of the at least one computing device, wherein the facial data includes an image of a face of the suspect, wherein the one or more processors are further configured to generate suspect operational metadata corresponding to the suspect facial recognition data, wherein the one or more processors are further configured to transmit the suspect operational metadata, wherein the suspect operational metadata includes a timestamp and a geographical location corresponding to the image of the suspect captured on the user's computing device, wherein the geographical location is obtained from a global positioning system (GPS) on the user's computing device, wherein the one or more processors are further configured to generate suspect history by providing an incident report, wherein the suspect history comprises previous incidents related to the suspect, the incident report further comprising the timestamp and geographic location of the previous incidents, wherein the one or more processors are further configured to display on a user interface a map of the previous incidents, wherein the one or more processors are further configured to generate search results based on input by the user, wherein the input comprises a name of the suspect, an image of the suspect, and the previous incidents related to the suspect.

The disclosure presented herein further relates to a computer implemented method for suspect identification, the method comprising: storing, by a suspect identification system, suspect facial data from an image of a suspect captured on a user's computing device; wherein the suspect facial data is generated by one or more computing devices that include one or more programs containing instructions associated with the suspect identification system; receiving the suspect facial data transmitted from the user's computing device; performing facial recognition processing on the suspect facial data to establish suspect facial recognition data; comparing the suspect facial recognition data to a database of facial recognition data to identify any suspect match; transmitting personal information of an identified suspect if there is a suspect match or if there is not a suspect match, present an indication that the suspect match is not found, displaying on a user interface on the user's computing device a trespass statement, storing an audio recording of the user reading the displayed trespass statement to the suspect, creating an incident report, the incident report comprising the suspect facial recognition data and details related to any previous incidents associated with the suspect; storing the incident report in the one or more databases, wherein the facial recognition data includes an image of the suspect, generating search results based on input by the user, the input comprising the name of the suspect, the search results of the suspect comprising an image of the suspect and the previous incident reports of the suspect, generating operational metadata corresponding to the generated suspect facial recognition data; transmitting the operational metadata, generating operational metadata corresponding to the generated suspect facial recognition data; transmitting the operational metadata, wherein the operational metadata is comprised of a timestamp and geographical location corresponding to the image of the suspect captured on the user's computing device; and generating suspect history, wherein the suspect history includes previous incident reports of the suspect, the suspect history presented to the user, the incident reports further comprising the timestamp and geographic location of the previous incidents.

DEFINITIONS

Memory refers to a computer memory, which is any physical device capable of storing information temporally or permanently. For example, Random Access memory (RAM), is a volatile memory that stores information on an integrated circuit used by the operating system, software, and hardware.

A server is a computer that provides data to other computers. It may serve data to systems on a local area network (LAN) or a wide area network (WAN) over the Internet.

A local area network may serve as few as two or three users (for example, in a small-office network) or several hundred users in a larger office. LAN networking comprises cables, switches, routers and other components that let users connect to internal servers, websites and other LANs via wide area networks.

A wide area network (WAN) is a geographically distributed private telecommunications network that interconnects multiple local area networks (LANs).

Wi-Fi is the standard wireless local area network (WLAN) technology for connecting computers and myriad electronic devices to each other and to the Internet. Wi-Fi is the wireless version of a wired Ethernet network, and it is commonly deployed alongside ethernet.

A database is an electronic filing system, generally in a computer. A collection of information (usually as a group of linked data files) organized in such a way that a program can quickly select pieces of data.

A computer network ("network") is a group of computer systems and other computing hardware devices that are linked together through communication channels to facilitate communication and resource-sharing among a wide range of users.

A computing device is any electronic equipment controlled by a CPU (Central processing Unit), including desktop and laptop computers, smartphones and tablets. It usually refers to a general-purpose device that can accept software for many purposes in contrast with a dedicated unit of equipment such as a network switch or router.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
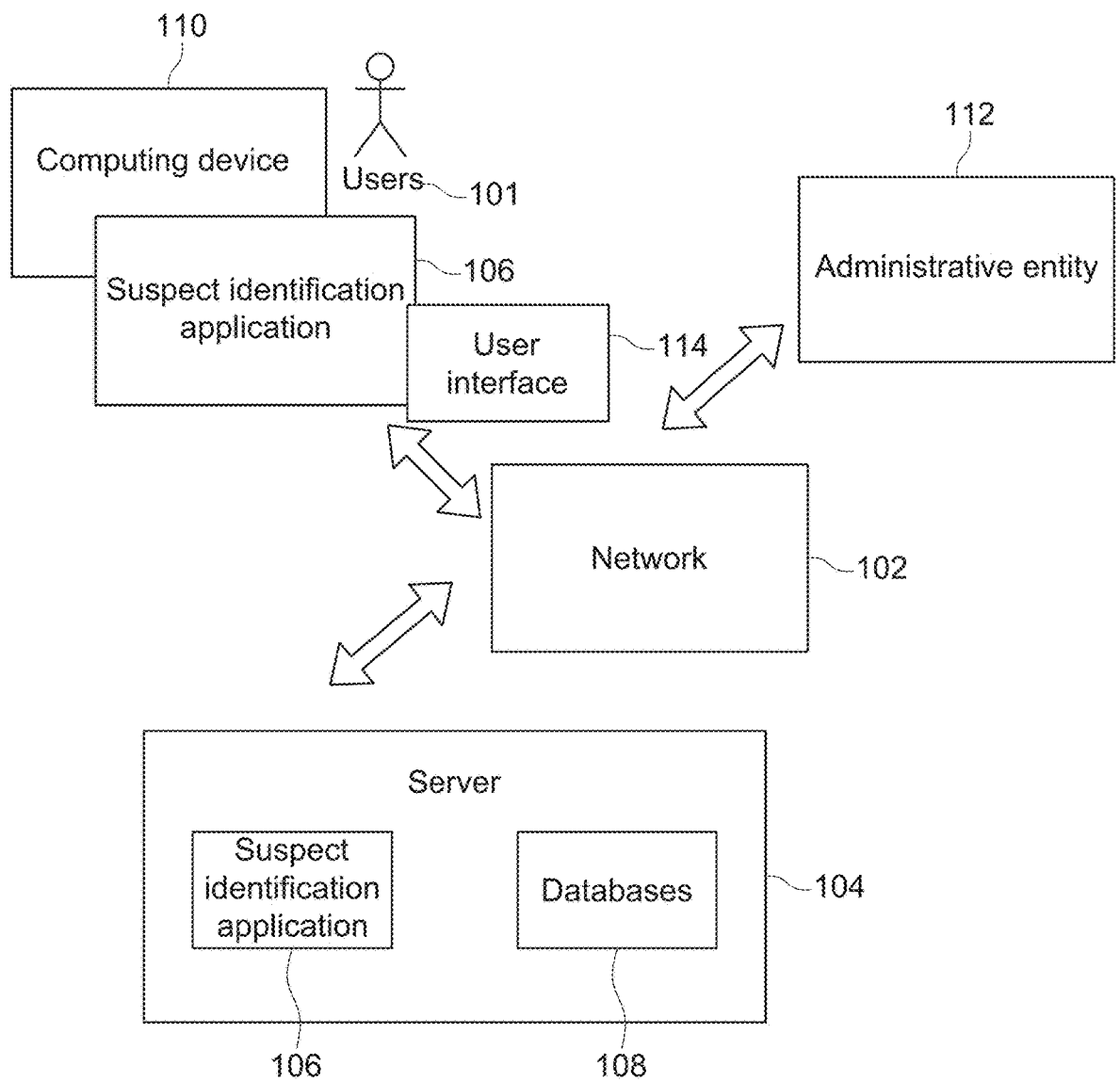
FIG. 1 depicts a block diagram depicting a computing environment, in accordance with one embodiment of the present invention.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item, or may indicate more items. Thus, the term "set" may be equivalent to "one or more" as used herein.

The present invention relates to storing suspect information and also a system for recording trespass statements read to potential suspects. The process of storing suspect information involves a myriad of tasks, including but not limited to, generating facial data from an image of a suspect captured on a user's computing device, comparing facial recognition data processed from the image to a database of known facial recognition data, displaying on the computing device a trespass statement, recording the reading of the trespass statement to the suspect and transmitting the suspects personal information and the recorded trespass statement.

Typically, identification of a suspect and retrieval of their information is conducted in a manner utilizing telephones, facsimiles, email, and dedicated computer programs that are installed and operated on a computer in a law enforcement headquarters or vehicle. These conventional methods, however, tend to be redundant, time consuming, error-prone, and overall inefficient. What is needed is an online system and method for connecting these parties and providing a central location to communicate. In addition, the current suspect identification method and process of updating of suspect information may be difficult as a vast network of databases and law enforcement support is required.

The system in the present invention is designed to provide centralized administration of suspect identification and suspect information retrieval that is globally accessible by users of the system. The system also allows for the storing and updating of suspect personal information at a centralized location. Some of the advantages of such a system, as included in one or more non-limiting embodiments below, is a decrease in paper handling, redundancy, extra costs, inaccuracy, and any general inefficiency associated with more conventional modes of suspect identification and retrieval of suspect information.

FIG. 1 depicts a block diagram of a suspect identification system 100 in accordance with one embodiment of the present invention. FIG. 1 provides an illustration of one embodiment and does not imply any limitations regarding the environment in which different embodiments may be implemented. Suspect identification system 100 may be utilized by users such as users 101, whereby user 101 interacts with an application such as suspect identification application 106. Users 101 may be located at any physical location as desired by users 101. Users 101 may include without limitation police officers, other members of law enforcement, private security, private property owners, loss prevention departments or other any other type of user. Further, suspect identification system 100 may be usable by any one suspecting another person has committed a crime.

Suspect identification application 106 may be downloadable and installable by a user onto any suitable computing device, such as computing device 110. A computing device, such as computing device 110, and exemplary components is discussed in more detail later in the description with respect to at least FIG. 10. In some embodiments, suspect identification application 106 may be preinstalled on computing devices 110 by the manufacturer or designer or other entity. Further, suspect identification application 106 may be implemented using a web browser via a browser extension or plugin. Suspect identification application 106 may be innate, built into, or otherwise integrated into existing platforms such as, without limitation thereto, a website, third-party program, iOS™, Android™, Snapchat™, Getty Images™, Instagram™, Facebook™, or any other platform capable transmitting, receiving, and presenting data.

Further, a user interface, such as user interface 114, may be displayed to users 101 via suspect identification application 106. User interface 114 may be included with suspect identification application 106. User interface 114 may have a plurality of buttons or icons or other types of selector tools that are selectable through user interface 114 by users 101 to instruct suspect identification application 106 perform particular processes in response to the selections.

Computing devices 110 may be in communication with one or more servers such as server 104 via one or more networks such as network 102. Server 104 may be located at a data center or any other location suitable for providing service to network 102 whereby server 104 may be in one central location or in many different locations in multiple arrangements. Server 104 may comprise a database server such as MySQL® or Maria DB® server. Server 104 may have an attached data storage system storing software applications and data. Server 104 may receive requests and coordinate fulfillment of those requests through other servers. Server 104 may comprise computing systems similar to computing devices 110.

Server 104 may comprise a number of modules that provide various functions related to suspect identification application 106 and suspect identification system 100 using one or more computing devices similar to computing device 110. Modules may be in the form of software or computer programs that interact with the operating system of server 104 whereby data collected in one or more databases (e.g. such as databases 108) may be processed by one or more processors within server 104 or computing device as well as in conjunction with execution of one or more other computer programs. Software instructions for implementing the detailed functionality of the modules may be written in or natively understand included but not limited to C, C++, Visual Basic, Java, Python, TCL, Perl, Scheme, Ruby.

Databases 108 may be a repository that may be written to and/or read by suspect identification application 106. Information gathered from suspect information program 106 may be stored to databases 108 as well as any analyze techniques, metadata, and additional data that suspect information program 106 may be used to analyze, extract, create, and associate tags in content. In one embodiment, databases 108 is a database management system (DBMS) used to allow the definition, creation, querying, update, and administration of a database(s). In the depicted embodiment, databases 108 resides on server 104. In other embodiments, databases 108 resides on another server, or another computing device, as long as databases 108 is accessible to suspect information program 106.

Modules may be configured to receive commands or requests from computing device 110, server 104, and other outside connected devices over network 102. Server 104 may comprise components, subsystems, and modules to support one or more management services for Suspect identification system 100.

In one or more non-limiting embodiments, network 102 may include a local area network (LAN), such as a company Intranet, a metropolitan area network (MAN), or a wide area network (WAN), such as the Internet or World Wide Web. Network 102 may be a private network, a public network, or a combination thereof. Network 102 may be any type of network known in the art, including a telecommunications network, a wireless network (including Wi-Fi), and a wireline network. Network 102 may include mobile telephone networks utilizing any protocol or protocols used to communicate among mobile digital computing devices (e.g. computing device 110), such as GSM, GPRS, UMTS, AMPS, TDMA, or CDMA. In one or more non-limiting embodiments, different type of data may be transmitted via network 102 via different protocols. In further non-limiting other embodiments, computing devices 110, may act as standalone devices or they may operate as peer machines in a peer-to-peer (or distributed) network environment.

Network 102 may further include a system of terminals, gateways, and routers. Network 102 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

Suspect identification system 100 may also include one or more administrative entities such as administrative entity 112. While administrative entity 112 is depicted as a single element communicating over network 102, administrative entity 112 in one or more non-limiting embodiments may be distributed over network 102 in any number of physical locations. Administrative entity 112 may manipulate the software and enter commands to server 104 using any number of input devices such as keyboard and mouse. The input/output may be viewed on a display screen to administrative entity 112.

Suspect identification application 106 operates to provide a system and method to store suspect information. Suspect identification application 106 receives the suspect facial data from a computing device such as computing device 110, compares the suspect facial recognition data to known facial recognition data, transmits personal data of a matched suspect to the computing device, displays on the computing device a trespass statement, stores an audio recording of a user reading the trespass statement to the suspect, and transmits the recording and personal information of the suspect to server 104.

In the depicted embodiment, suspect identification application 106 resides on server 104 and utilizes network 102 for computing device 110 to access the content. In some embodiments, suspect identification application 106 resides on computing device 110. In other embodiments, suspect identification application 106 may be located on another server or computing device, provided suspect identification application 106 has access to databases 108 and computing device 110 over network 102.

Figure 2:
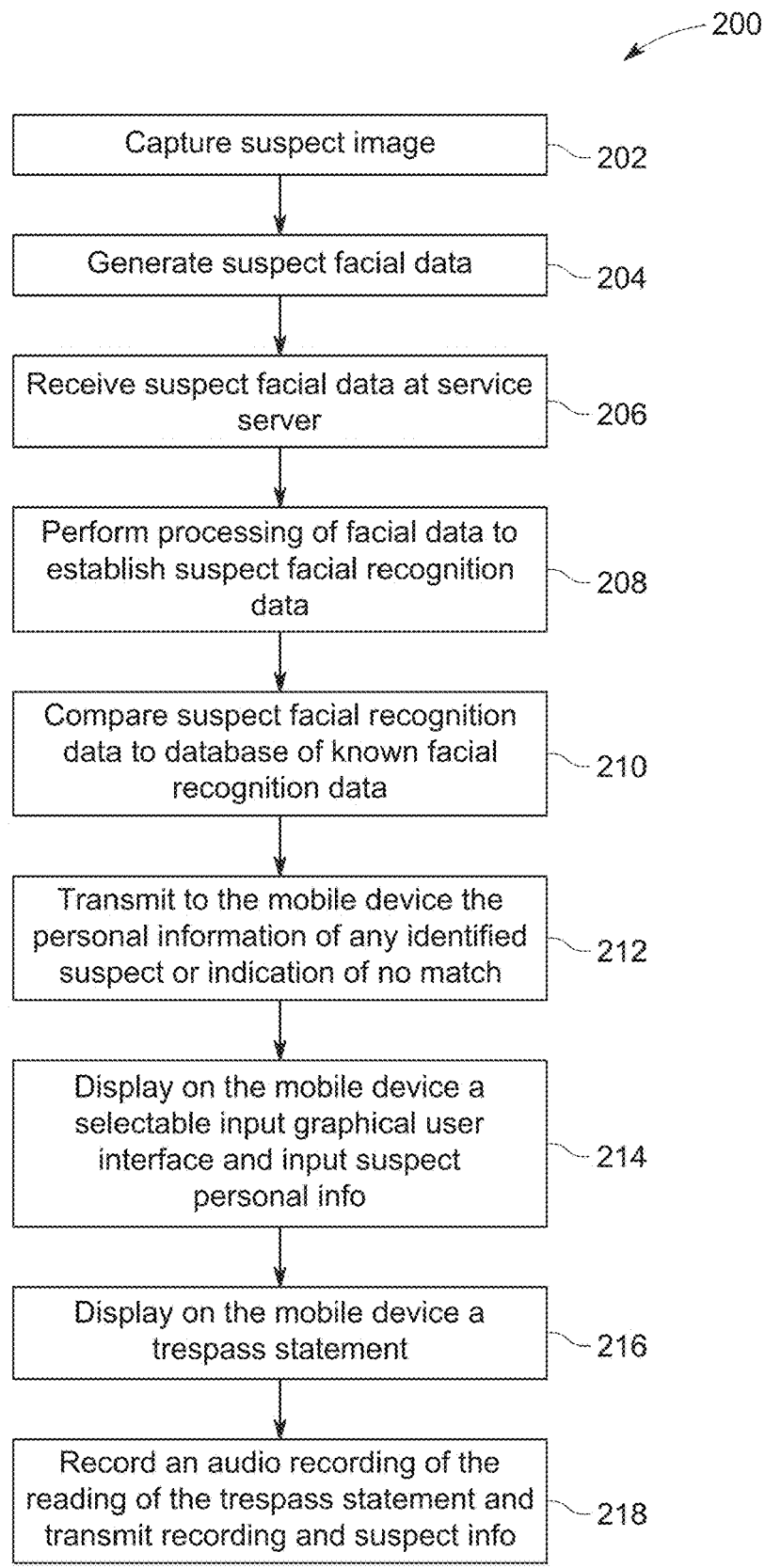
FIG. 2 depicts a flowchart of an exemplary process for identifying a suspect in accordance with an embodiment of the present invention.

FIG. 2 illustrates a flowchart depicting a an exemplary method for implementing suspect identification system 100 whereby one or more components included in FIG. 1, such as, without limitation, computing devices 110, server 104 and network 102 may be utilized while implementing the method. FIG. 2 depicts a flowchart of the operational steps taken by suspect identification application 106 to receive the suspect facial data from a computing device, compare the suspect facial recognition data to known facial recognition data, transmit personal data of a matched suspect to the computing device, display on the computing device a trespass statement, record the user reading the trespass statement to the suspect, and transmit the recording and personal information of the suspect to the server, within suspect identification system 100 of FIG. 1, and in some embodiments transmit all associated information to local or federal authorities.

Users 101 may initially register to become a registered user associated with suspect identification system 100 or any platforms which suspect identification system 100 has been integrated on with suspect identification application 106. Platforms may be downloadable and installable on computing devices through suspect identification application 106. In one or more non-limiting embodiments, suspect identification system 100 or another platform may be preinstalled on computing devices 110 by the manufacturer or designer. Further, suspect identification system 100 may be implemented using a web browser via a browser extension or plugin.

In further embodiments, users 101 may establish one or more different profiles whereby the different profiles may individually be associated with specific roles of users 101. For instance, user 101 may have separate profiles associated with suspect identification application 106, such as, for instance, whether user 101 is acting in the role as an individual person or in the role of a business entity or law enforcement personnel. In other embodiments, separate profiles are not created and all information pertaining to all roles of the user 101 may be accessible as well.

Turning to FIG. 2, in step 202, suspect content is captured by users 101 using suspect identification application 106 and the user's computing device (e.g. smart phone, smart watch, tablet, or any other type of computing device). Suspect content may include, without limitation, a photo, audio file, video file, music file, and/or content capture within computing device's 110 native camera, photos application, or API. When content is in the form of an image the image may be presented in any number of image formats such as .jpg, gif, raw or may be selected from multimedia files such as mpg, avi, mov, etc. any computer definable image format may be utilized for processing by suspect identification system 100.

Figure 3:
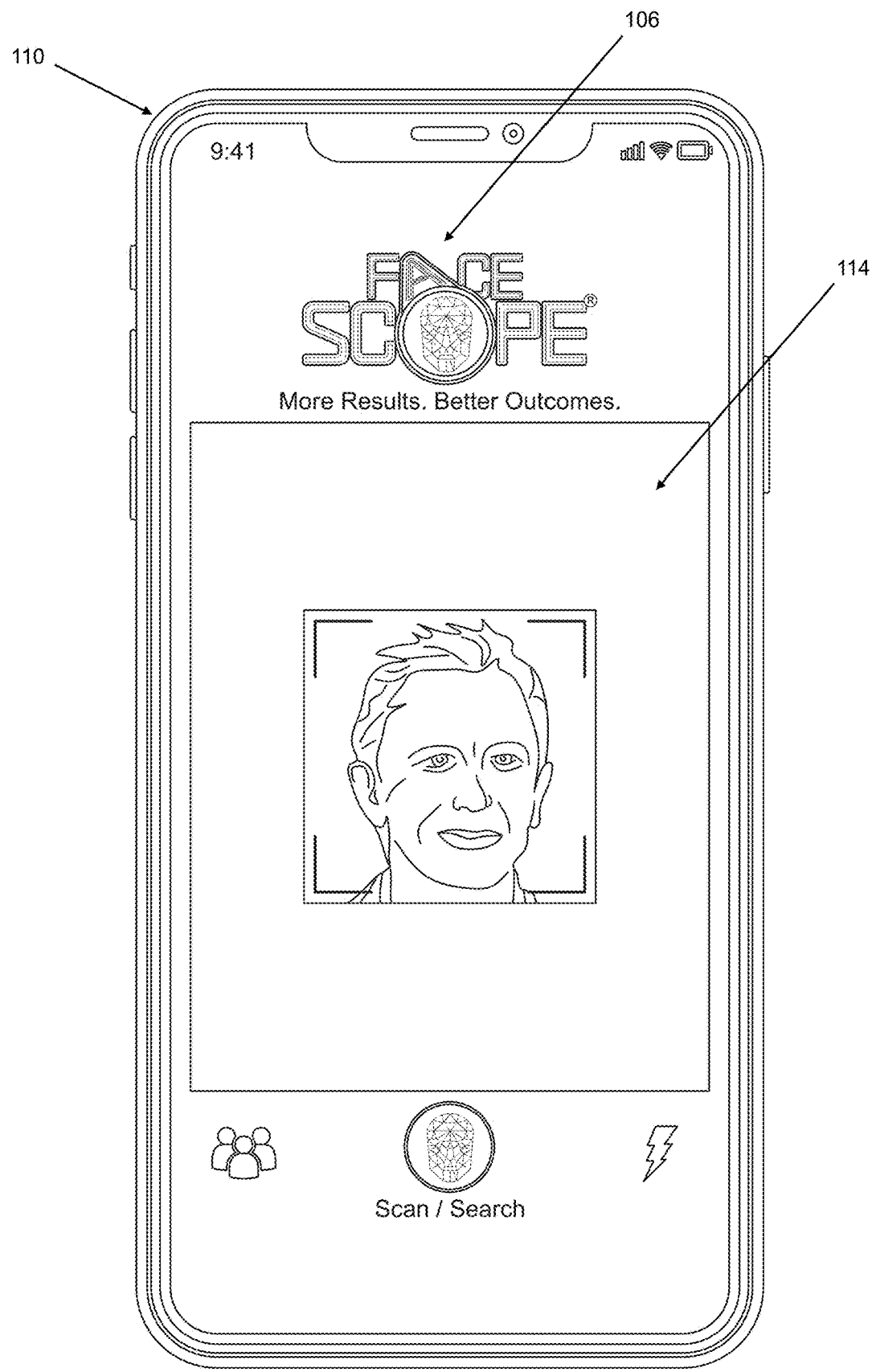
FIG. 3 is an image of a display screen showing a suspect image capture function.

To capture suspect content, user 101 accesses suspect identification application 106. Once suspect identification application 106 is accessed, user interface 114 may be presented to users 101 on the display unit of the computing device 110 used by users 101 to access suspect identification application 106. User interface 114 in suspect identification application 106 (e.g. as shown in FIG. 3) may then present a suspect capture screen with a selectable digital scan/search selectable button. In one or more embodiments, user 101 of computing device 110 may then point the computing device's 110 camera at the suspect that user 101 has stopped to question for trespassing on a private property or that is suspected of committing any other crime. The suspect may be an unknown person that a police officer, other member of law enforcement, private security, private property owner, loss prevention, or other user believes is a person who is trespassing or is in the process of or has committed a crime. Once user 101 has suspect in the photo taking frame of the camera, user 101 may press the scan/search digital button to capture the image of the suspect on suspect identification application 106.

In other embodiments of suspect identification system 100, content may be captured by a wearable device such as, without limitation, Google Glass™, or another form of wearable connected to computing device 110, server 104, or network 102. A wearable device may be in the with in the form of eyeglasses positioned above the nose of user 101 having one or computing devices. This wearable device in the form of eyeglasses may have a small video screen and camera that connect wirelessly to server 104, computing device 110, and network 102. Further, the eyeglasses may include a screen that resides in front of the user eyes to allow users 101 to view information displayed on the screen or superimposed on to the lens of the glasses.

In one or more non-limiting embodiments, content may be received by one or more sensors installed on a property, near a property, or in the vicinity of a property such as a public place, business store, or a household. Sensors may include one or more suitable types of sensors, such as, without limitation thereto, an optical sensor, an image capturing device such as a still camera or video camera, an audible sensor, a proximity sensor, a movement sensor, or a weight sensor.

Sensors may have infrared ("IR") detectors having photodiode and related amplification and detection circuitry. In one or more other non-limiting embodiments, radio frequencies, magnetic fields, and ultrasonic sensors and transducers may be employed. Sensors may be arranged in any number of configurations and arrangements. Sensors may be configured to send and receive information over network 102, such as satellite GPS location data, audio and video, time to server 104 and stored in the one or more databases 108.

At step 204, after having captured content related to the suspect, suspect identification system 100 generates suspect facial data. Suspect identification application 106 uses facial recognition, an algorithm which is capable of analyzing an image of the suspect's face and the facial features and converting them to biometric data, to generate the facial data. The facial data is a combination of the biometric data and any other data the program derives from the suspect's image.

Suspect identification system 100 may natively have object recognition technology that may detect and recognize faces from one or more type of objects from the content received and may use any technology currently implemented or known by those of ordinary skill in the art. Suspect identification system 100 may integrate Artificial Intelligence and Machine Learning known by those of ordinary skill in the art. After capturing content, suspect identification application 106 server may analyze whether the content is a photo or video based on file type (codec)/file size.

Different recognition results may be generated for different types of faces. For persons, suspect identification system 100 may identify objects such as exact identity, race, ethnic, and gender classification, hair color, or shape. In one or more non-limiting embodiments, the object detected may be a person, or portion of a person such as their hair, face, leg, or arm. Numerous other types of objects may be detected by suspect identification system 100 including objects carrying text or other alphanumeric characters, and objects associated with people for purpose of identifying a brand or individual such as clothing, including without limitation, a purse, a briefcase, or a hat. Other types of objects that can be detected from content processes include animals, buildings, locations, and landmarks.

Once one or more faces are identified, the portion of the content that contains detected faces may then be cropped. By first detecting the faces in the content and cropping only that portion of the face or faces, suspect identification system 100 need not process the entire image. Further, in one or more embodiments where the processing occurs remotely away from computing device 110, such as at server 104, much less content data needs to be sent over network 102.

In one or more non-limiting embodiments, facial data may transmitted to server 104 as a data packet along with one or more identifying operational metadata to accompany the detected facial image. Operational metadata may include the information related to suspect. Operational metadata may include a timestamp taken from the time of creation of content such as when suspect was trespassing on property. Operational metadata may include a geographic stamp including, without limitation, a city, state/province, country, time zone, Internet Service Provider, or net speed determined by the GPS of computing device 110.

At step 206, server 104 receives detected facial image along with any operational metadata. The largest image of a face presented on the screen is stored on databases 108. In one or more embodiments, smaller images of faces are then stored on databases 108.

At step 208, server 104 performs processing of the facial data or other suspect personal information to establish suspect facial recognition data.

Using image processing and image recognition algorithms, server 104 processes the persons facial image and searches database 108 for image data which represents a match to captured facial image. By using facial recognition processing, an accurate identity match may be established. Various programs and systems for performing facial recognition processing as known in the art may be utilized.

At step 210, server 104 compares the suspect facial recognition data to data located in database of known facial recognition data. Server 104 compares the image of the face of the suspect to images in a database 108 of known people to determine a match of the facial recognition data captured from the suspect.

Database 108 may have images as well, audio, video, and/or other content uploaded by other users 110 along with corresponding identifying information such as name, birth date, attributes, address, phone number, or identifying markers. Database 108 may also have already existing public data such as from existing external databases with data pertaining to the images or video of suspects along with identifying information. If content already exists publicly online, server 104 may utilize any known network search methods, to initiate a content search or query for content. In one or more non-limiting embodiments, another platform may be utilized whereby third parties may search for content.

At step 212, server 104 transmits to computing device 110 the personal information of any identified suspect, or person, matched in step 210 with facial recognition data captured by users 110 whereby server 104 may transmit to users 101 information related to the suspect found in the data of databases 108, such as an image of the suspect, the suspect's name, the suspects date of birth, address, known tattoos, or any other identifying personal information.

Figure 4:
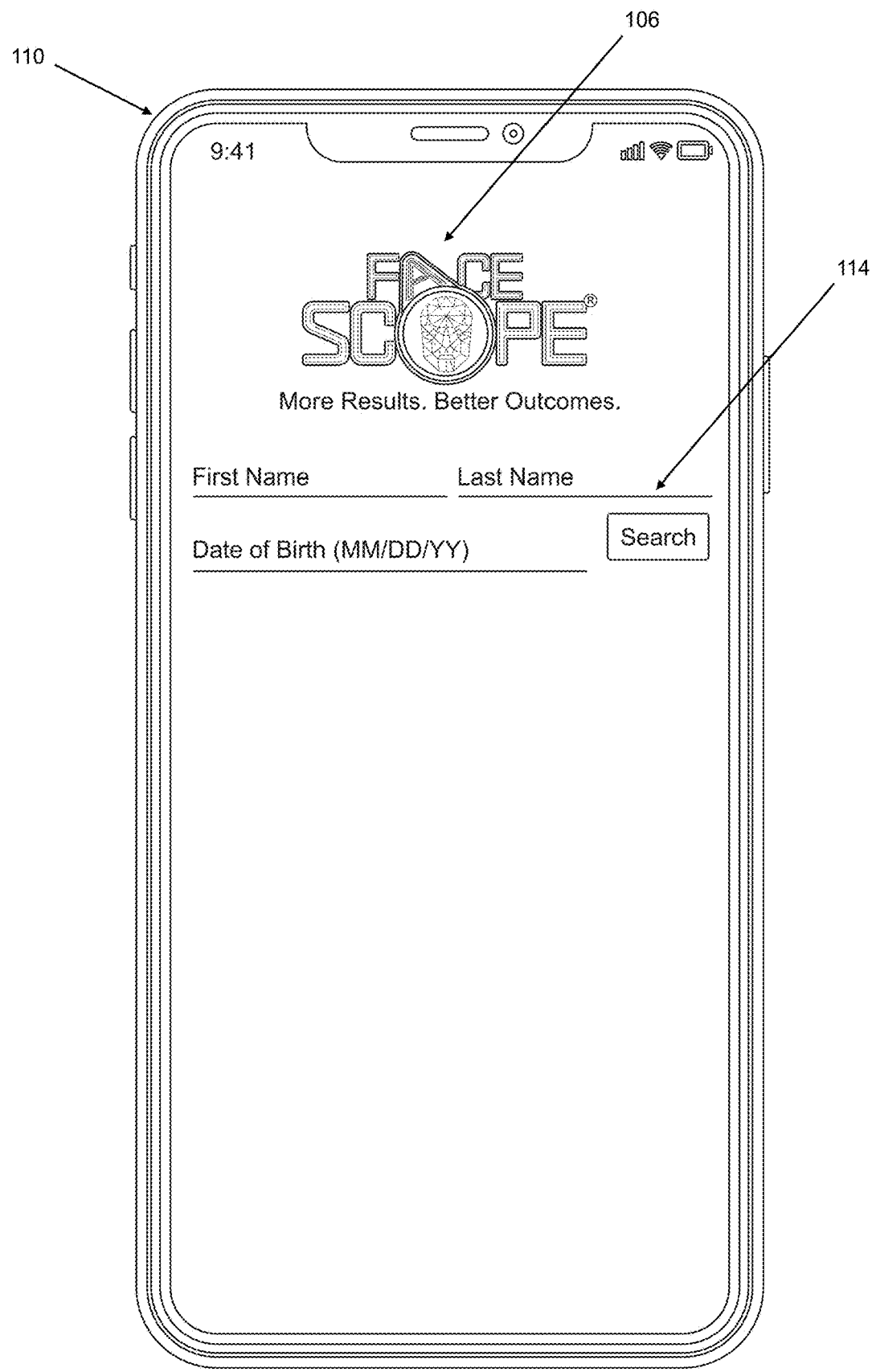
FIG. 4 is an example display screen showing an example of the suspect information program's search functionality.

As shown in FIG. 4, user interface 114 may present to user 101 a text window interface or other screen whereby user 101 may at any point enter a suspect's personal information, including first and last name, to search for a suspect instead of, or in conjunction with, using the facial recognition functionality, as well as any other identifying information (e.g. such as whether the suspect has a tattoo or other identifying feature). To obtain this information, users 101 would visualize the identifying information from the suspect or ask the suspect for his name and date of birth or obtain this information from the suspects identification or acquire the information from a third party source or method. Searching for the suspect allows user 101 to determine if the suspect has trespassed, or has a criminal history, in the same general area before.

Figure 5:
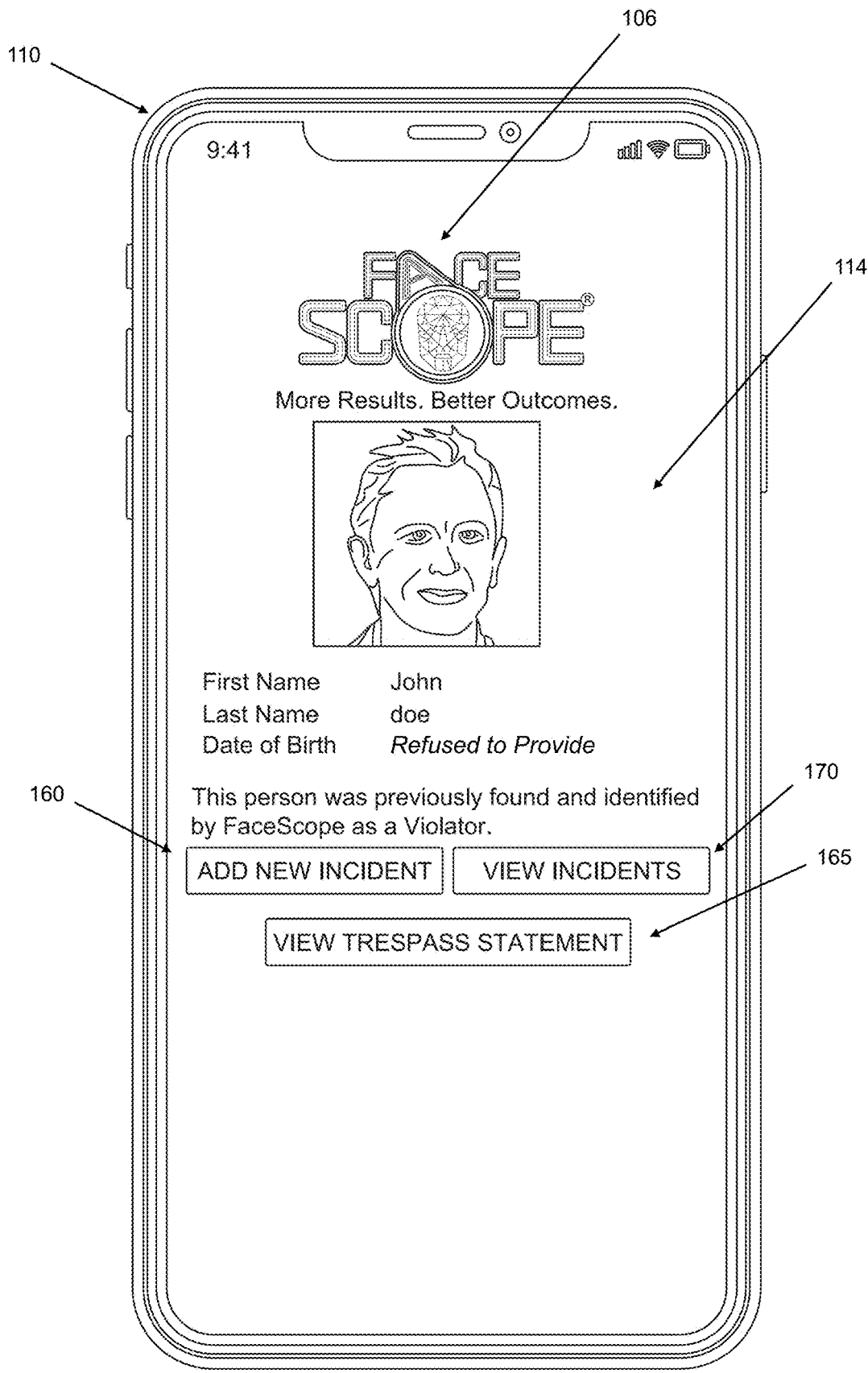
FIG. 5 is an example display screen showing an example of the suspect information program's suspect information retrieval ability.
Figure 6:
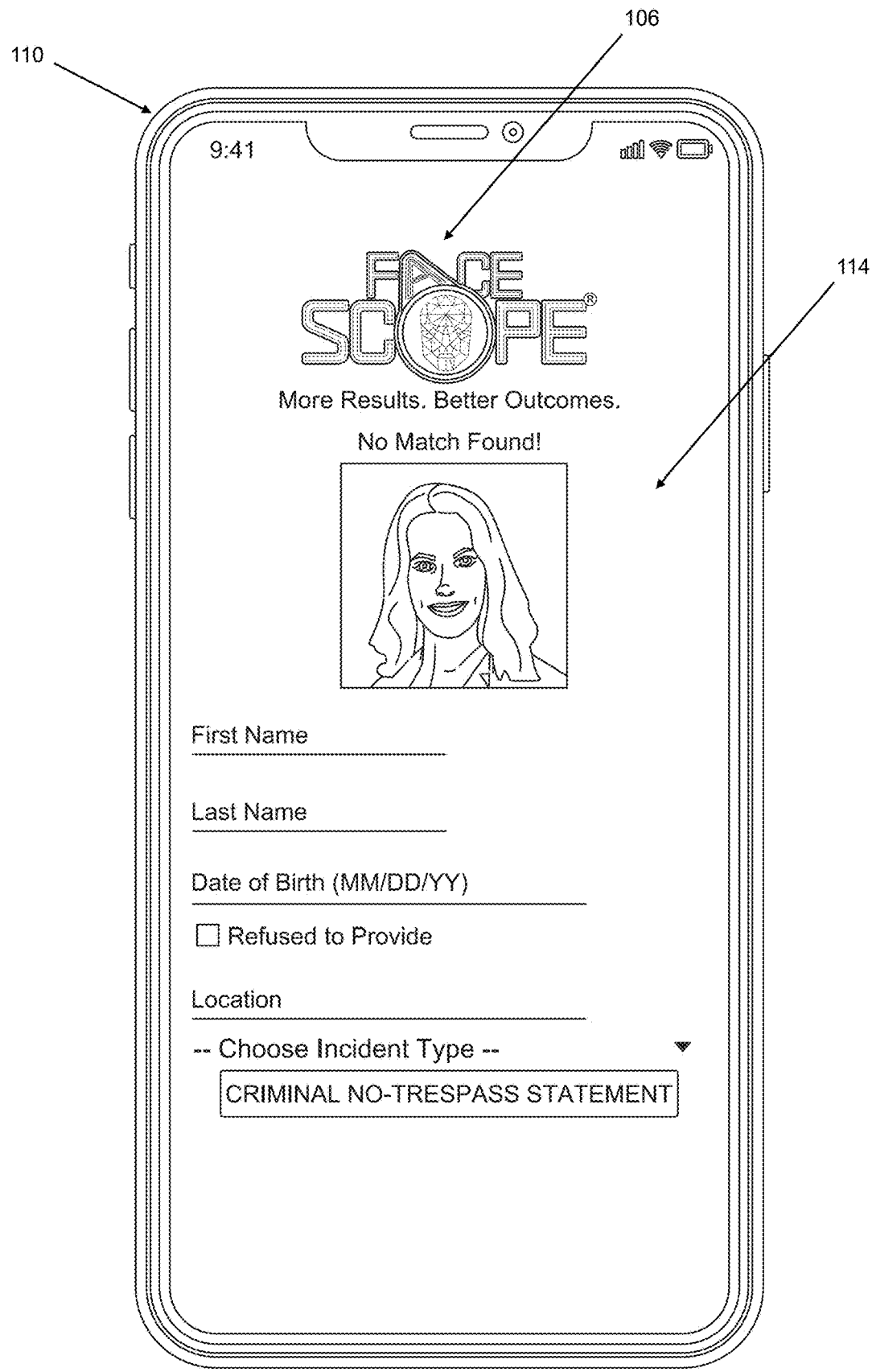
FIG. 6 is an example display screen showing an example of entering a new suspect's information.

In one or more embodiments, as shown in FIG. 5, the suspect information is sent by server 104 to user 101 and displayed through user interface 114 on computing device 110. In some embodiments a list of possible matches may be generated and displayed to user 101 as a drop down list or other display. The list of possible matches from these faces may also establish a list of names for each face such that user may scroll through and locate the correct suspect. If user selects on a particular suspect on the drop down list, user interface 114 may present a display where users 101 may obtain more information about the particular suspect. User 101 may be presented with a selectable "view incident button" 170 whereby once selected may view previous incidents related to the suspect. In one example, as shown in FIG. 6, user 101 may be presented with a selectable "add new incident button" 160 whereby once selected, user interface 114 may then present to user 101 a display whereby user 101 may create a new profile for suspect.

Step 212 in FIG. 2 further indicates that if the suspect does not have any data matches in database 108, an indication of "no match" is transmitted to the user 101 and displayed through user interface 114. User 101 through a text window interface may enter suspect's information including the suspects name, date of birth, location of incident, image of the suspect, suspect's visible tattoos or other identifying markers, and any other personal information commonly associated with suspects.

At step 214, user interface 114 may present to user 101 a text window interface whereby user additional input suspect personal information. This information may include additional suspect information in the case when the suspect was identified in step 210, including entering the suspect's image taken in step 202 and details of the new incident. As shown below, this suspect information is then transmitted to server 104 and stored in databases 108 along with any additional operational metadata. Databases 108 are then updated to the suspects known information profile or data on server 104. If the suspect was not identified in step 210, this information includes all the information of creating a new profile for the suspect, such as the information shown in FIG. 6. In FIG. 6, such information may include name, date of birth, as well as other important types of personal information such as addresses, telephone number, or any other type of information.

Figure 7:
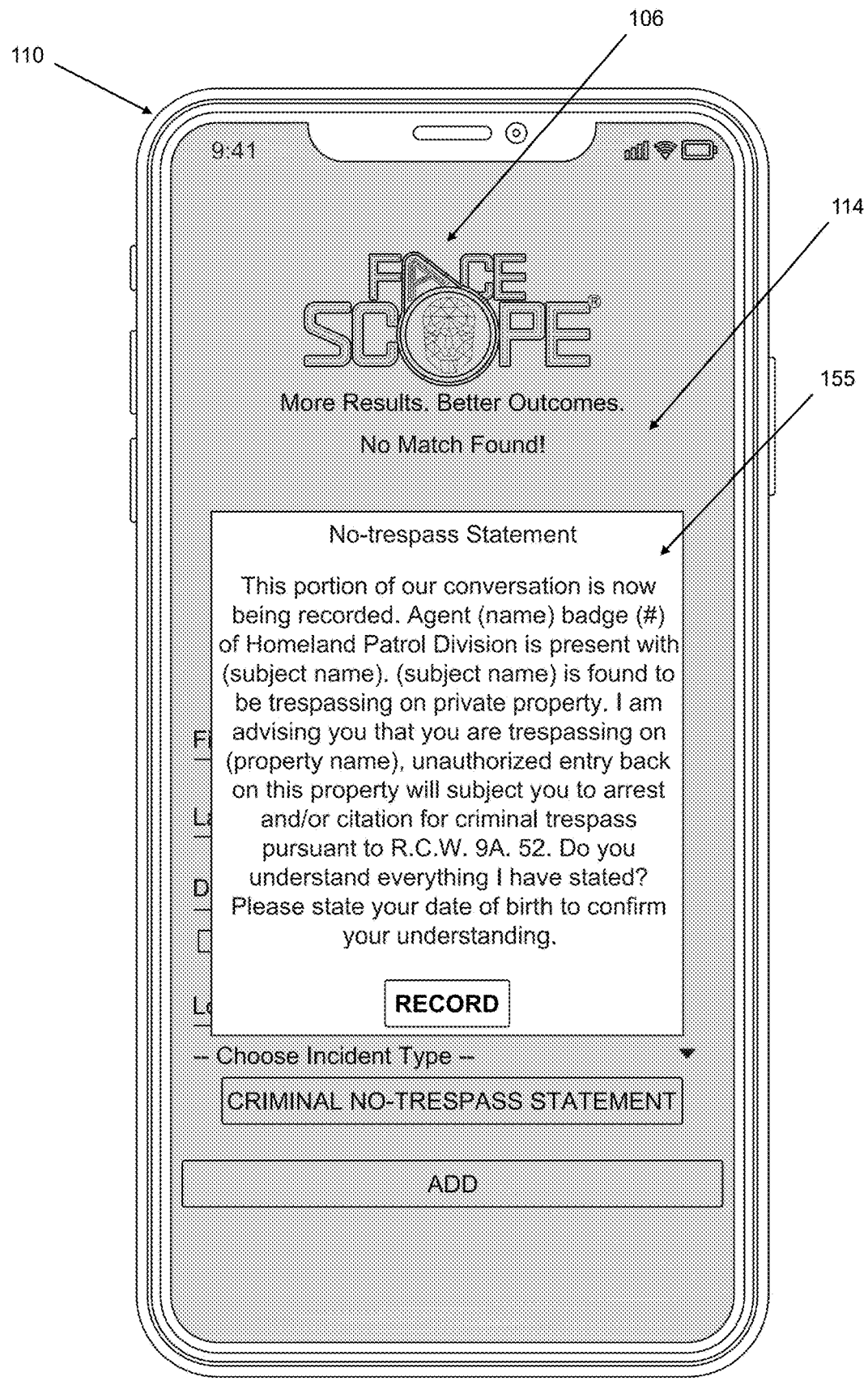
FIG. 7 is an example display screen showing a no trespass statement.

At step 216, a trespass statement such as trespass statement 155 as shown in FIG. 7 may be presented through user interface 114 and displayed to user 101 on computing device 110. In one embodiment, if the user wants to read a trespass statement whereby tress pass statement 155 is displayed, the user may press selectable button 165, for example, "criminal no trespass statement" through user interface 114, as shown in an example FIG. 6. After selecting the selectable button (e.g. "criminal no trespass statement") a screen having the trespass statement 155 (stating that the suspect is trespassing and may be arrested) may be displayed as shown in FIG. 7. Trespass statement 155 is one example of a trespass statement that may be read by user 101 to the suspect.

At step 218, as user 101 reads trespass statement 155 displayed through user interface 114, an audio or video recording of the reading of trespass statement 155 is made whereby the recording and suspect information is uploaded to server. In one example, the user reads trespass statement 155 displayed on the computing device in step 216 to the suspect after pressing a selectable record button on user interface 114 whereby users 101 may then press a selectable stop recording button on user interface 114 once finished recording. In another embodiment, the computing device automatically records the audio or video of the entire interaction between the suspect and users 101 whereby users 101 may then press a selectable stop recording button on user interface 114 once finished recording.

The user reads trespass statement 155 to the suspect to make the suspect aware that he has trespassed onto property they are not authorized to be on. Further, the recording of trespass statement 155 allows for easy access of the recording later on as proof that the suspect knew they were on property they were not allowed to be on if the suspect trespasses again in the future.

In one or more non-limiting embodiments, the content of trespass statement 155 may be determined by data pertaining to nationality and language spoken by suspect stored in databases 108 from external sources or data uploaded by one or more users 101 as well as the location of computing device 110 as determined by the GPS of computing device 110, or personal information entered by users 101. Once the geographical location is determined, server 104 may retrieve trespass statement 155 from databases 108 with the applicable laws for that location including a specific state or city. For example purposes only, if computing device 110 is located in the state of Washington, server 104 may retrieve from databases 108 a trespass statement 155 may include corresponding relevant criminal and/or civil laws pertaining to the applicable laws of the state of Washington such as (without limitation):

RCW 9A.52.070 which pertains to Criminal trespass in the first degree. (1) A person is guilty of criminal trespass in the first degree if he or she knowingly enters or remains unlawfully in a building. (2) Criminal trespass in the first degree is a gross misdemeanor.

RCW 9A.52.080 which pertains to Criminal trespass in the second degree. (1) A person is guilty of criminal trespass in the second degree if he or she knowingly enters or remains unlawfully in or upon premises of another under circumstances not constituting criminal trespass in the first degree. (2) Criminal trespass in the second degree is a misdemeanor.

In other embodiments, trespass statement 155 may instead be replaced by another document or statement such as Miranda Rights or any other legal documents whereby users 101 may be presented with a list of selectable crimes or violations. Once selected server 104 may retrieve statements documents associated with that crime or violation for users 101 may be presented the statement or document to read to the suspect.

In one or more non-limiting embodiments, a provided trespass statement, such as trespass statement 155, may be displayed in an appropriate language to ensure the suspect understand the nature of the statement and responds accordingly. The language may be determined by data pertaining to nationality and language spoken by suspect stored in databases 108 from external sources or data uploaded by one or more users 101. For example, if computing device 110 is determined to be in Washington, server 104 may retrieve from databases 108 a trespass statement 155 in the English language. In one or more embodiments, other language options may be provided on one or more selectable buttons presented to user on the user interface 114 of user computing device 110.

In one or more non-limiting embodiments, suspect identification system 100 may have a digital assistant functioning on server 104 or computing device 110, operable to perform and implement various types of functions, actions, and operations for suspect identification system 100. In one embodiment, a digital assistant module may utilize text to speech programming whereby the digital assistant can analyze an audio file that includes the suspect's voice and determine which language would be appropriate for trespass statement 155 to be provided in. In some embodiments, the digital assistant module may employ statistical language models to generate candidate text interpretations of auditory signals such as the audio recorded when capturing images or video of the suspect. For example, user 101 may capture suspect saying one or more statements in a different language whereby auditory signals may be sent along as with operational metadata or may be sent separately. Once captured, the digital assistant may determine the associated language based on analyzing and interpreting the audio file of the suspect's voice. This information is then stored in database 108 with associated suspect information such that when user interface 114 presents trespass statement 155, trespass statement 155 statement may be displayed in the determined language or, alternatively, digital assistant may recite trespass statement 155 in that language. Digital assistant may also determine when user 101 has finished reading trespass statement 155 and stopped the recording.

Figure 8:
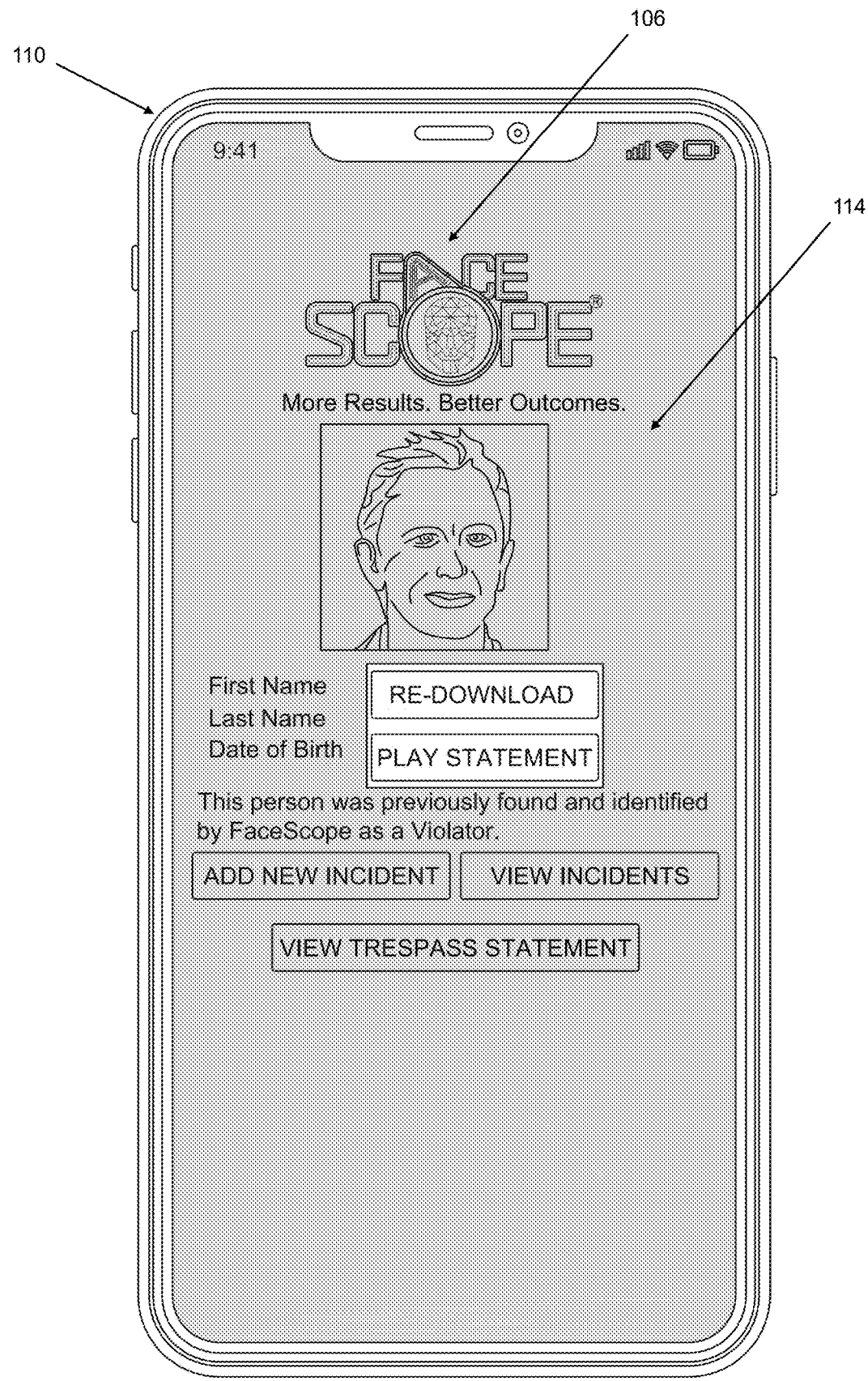
FIG. 8 is an example display screen showing an example of the suspect information program's suspect information storing functionality.
Figure 11:
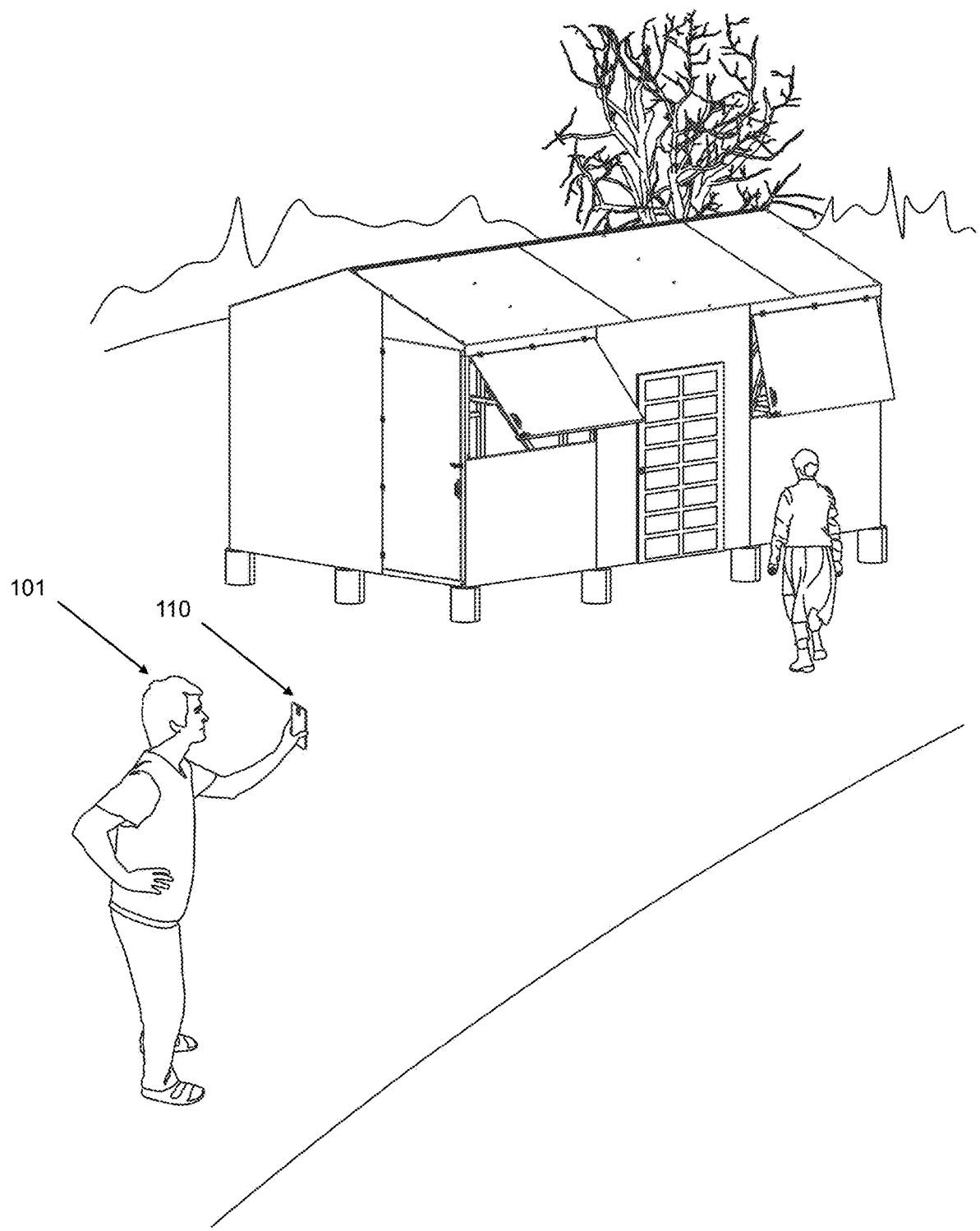
FIG. 11 depicts an illustration of a user recording a reading of trespass statement to a suspect.

As illustrated in FIG. 8 once the recording is complete, user interface 114 may present to users 101 the ability to replay the trespass statement 155 from the application or download the recording whereby the recording is then saved to computing device 110. In other non-limiting embodiments, suspect identification system 100 may transmit an automatically generated email, text, or other notification message with the recorded statement. FIG. 11 is an illustration of user 101 reading a trespass statement, such as trespass statement 155, from user's computing device 110. After the trespass statement 155 is read to the suspect and recorded, the recording and any newly entered suspect information, including the suspects name, date of birth, the image captured in step 202, any known tattoos, identifying information, the incident location, incident details, and any other information recorded from the inquiry with the suspect is transmitted to server 104 over network 102. In one or more embodiments, server 104 may create an incident report of the transmitted data and store the incident report and all suspect information together in a suspect profile on databases 108 with other associated data pertaining to the suspect, as to allow easy access of the suspect's information again during another inquiry or legal action.

Figure 9:
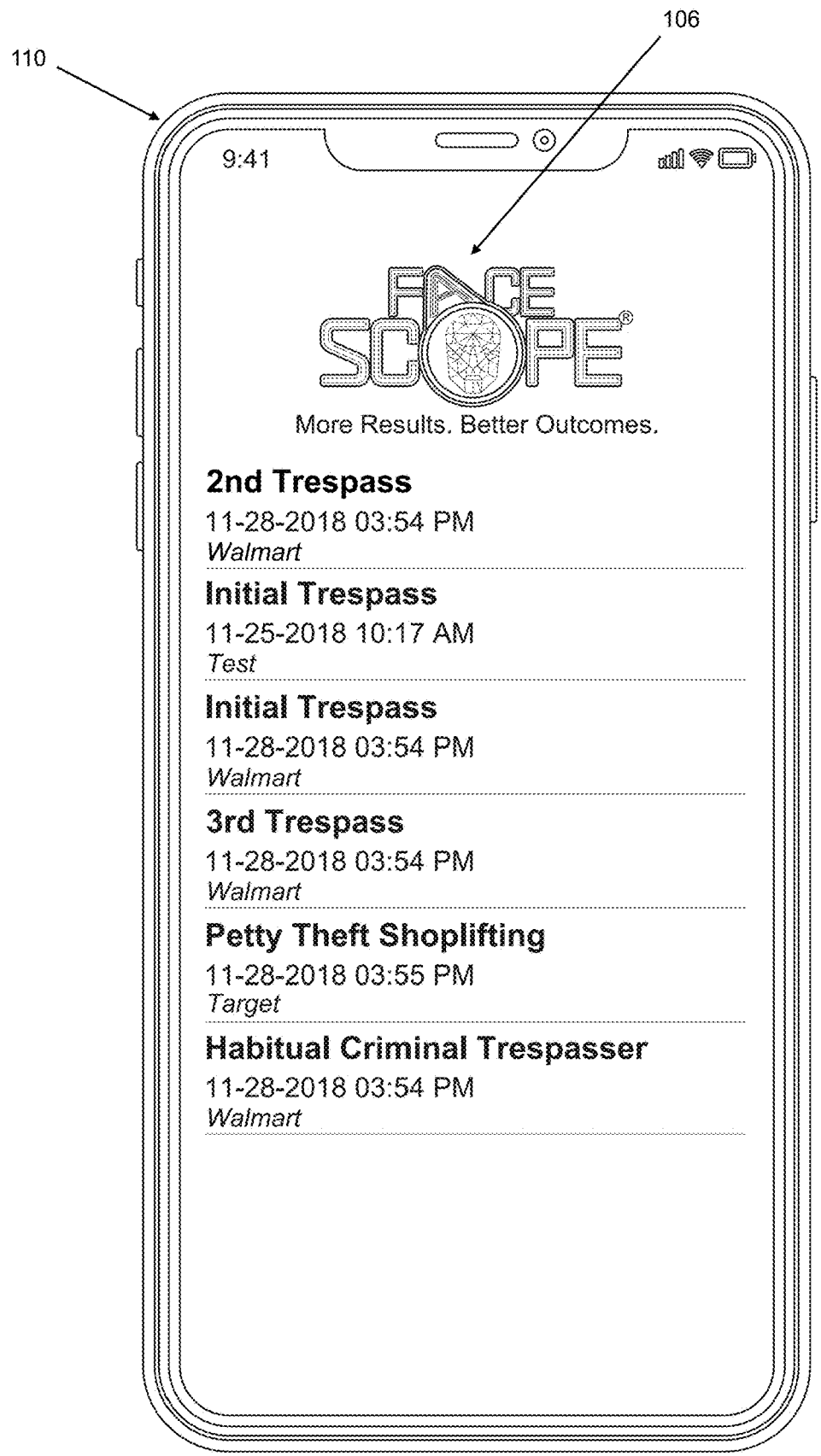
FIG. 9 is an example display screen showing an example of the suspect information program's suspect history functionality.

Incident reports may also be presented in the form of pop-up windows or another form of display presented to user 101 when identifying or searching for an identification match for suspect. FIG. 9 is an example display screen showing an example of an overall incident report that includes a suspect's history with respect to previous incidents FIG. 9 shows that user interface 114 may show users 101 a complete history of the suspect's incident reports such as trespassing and reports made by other users 101 of suspect identification system 100 and inquires made at different times and locations as well as incident reports collected from external sources. Incident reports may be displayed to users 101 in reverse chronological order or based on the severity of the incident report in one or more non-limiting embodiments. Incident reports may be transmitted to federal or local authorities to assist in identifying and capturing terrorists and criminals.

Users 101 may also be presented with geo-spatial environment having a virtual map of the geographical location in which incident reports are located. The virtual map may have geography and topography, which parallels the geography and topography of the physical real world. For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be connected with the displayed incident reports associated with the suspect (e.g. as shown in FIG. 9), and may be displayed as markers, pins, or any other identifier at their respective locations of occurrence.

Figure 12:
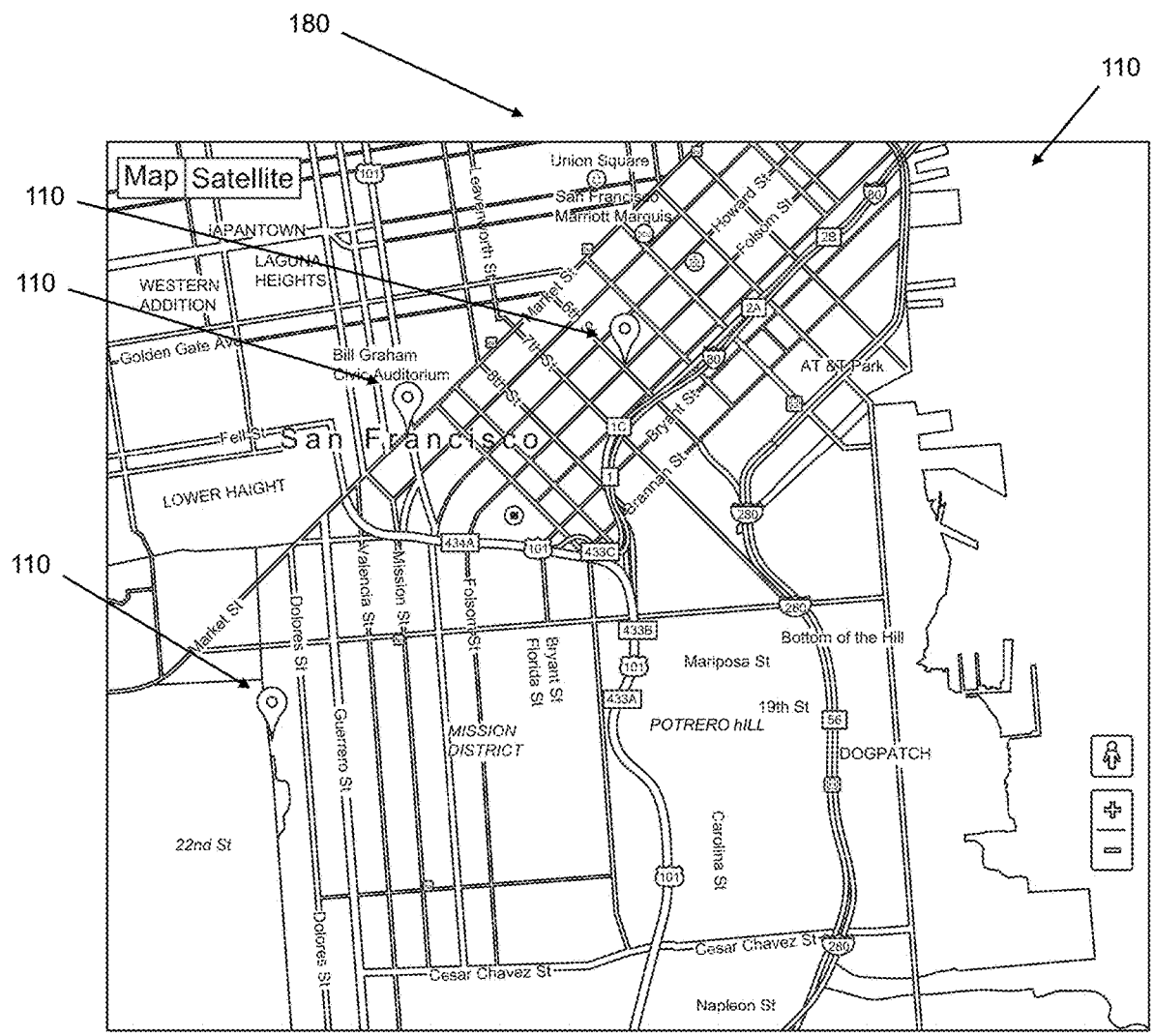
FIG. 12 depicts a map user interface for viewing incidents of suspects.

FIG. 12 is an illustration of a map that connects the geographical locations of where the trespassing or other suspect activity as recorded in the incident reports as shown in FIG. 9 took place. Incident reports' position on the virtual map corresponds to their position the real world as shown in FIG. 12. For instance, if an incident happened at the corner of Elm and Maple in the real world, a corresponding position on the virtual map pertaining to the corner of Elm and Maple may be displayed through user interface 114. In one or more non-limiting embodiments, incident reports may be displayed as differentiating markers based on the time period within which an incident report is created. For instance, if incident report was created within a certain predetermined threshold of time, the incident report may be displayed as a different marker than an incident report created outside a predetermined threshold of time. An example would be if incident report was created within one month of the present date, the incident report may be displayed as a red marker. If incident report was created within six months of the present date but longer than one month ago, the incident report may be displayed as a yellow marker. If an incident report was created present date but longer than six months ago, the incident report may be displayed as a blue marker.

Users 101 location at a specific time or time period may be determined as users 101 are moving from one physical location to the next physical location and displayed on a map 180 (e.g. as shown in FIG. 12) such that users 101 may see their location in relation to the incidents from the incident reports. Server 104 may analyze users' 101 position as they navigate the range of geographic coordinates in the real world such as when they are moving to from one area to another in real time.

Figure 10:
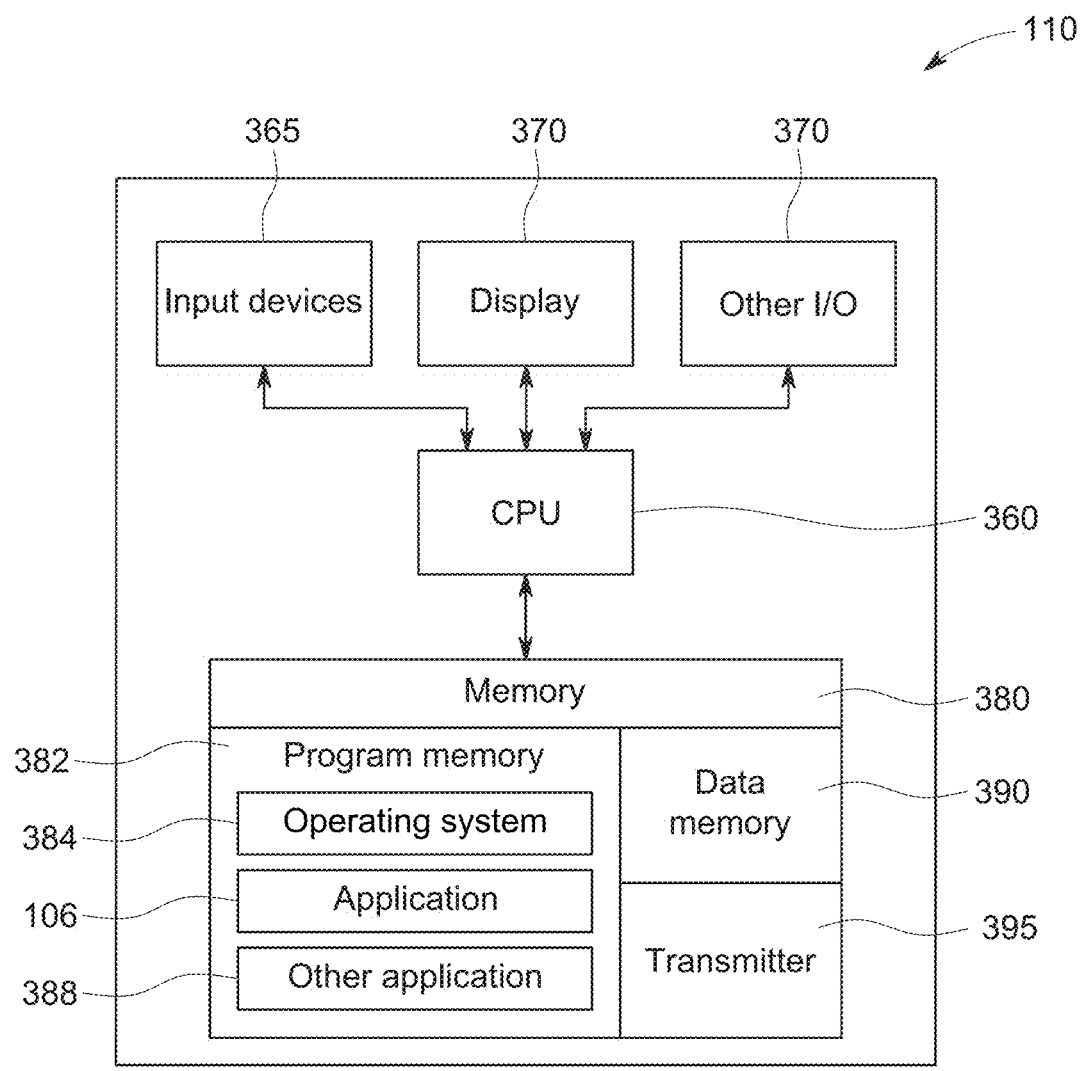
FIG. 10 depicts a block diagram depicting the components of a computing device.

One or more embodiments of computing device 110 are further detailed in FIG. 10. Computing device 110 may comprise hardware components that allow access to edit and query suspect identification system 100. Computing device 110 may include one or more input devices such as input devices 365 that provide input to a CPU (processor) such as CPU 360 notifying it of actions. The actions may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera- or graphical image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU may communicate with a hardware controller for devices, such as for a display 370. Display 370 may be used to display text and graphics. In some examples, display 370 provides graphical and textual visual feedback to a user.

In one or more embodiments, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 370 may also comprise a touch screen interface operable to detect and receive touch input such as a tap or a swiping gesture. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory such as program memory 382 capable of storing programs and software, such as an operating system such as operating system 384, suspect identification application 106, and other computerized programs or application programs such as application programs 388. Memory 380 may also include data memory such as data memory 390 that may include database query results, configuration data, settings, user options or preferences, etc., which may be provided to program memory 382 or any element of computing device 110.

Computing device may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of Suspect identification system 100 while in communication with network 102. Computing device 110 may have location tracking capabilities such as Mobile Location Determination System (MLDS) or Global Positioning System (GPS) whereby they may include one or more satellite radios capable of determining the geographical location of computing device 110.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A suspect identification system comprising:
   one or more databases coupled via a network;
   one or more processors coupled to the one or more databases; and
   at least one computing device coupled to the one or more processors and the one or more databases via the network, wherein instructions are executed by the at least one computing device to perform:
      generating suspect facial data from an image of a suspect captured on a user's computing device;
      receiving the suspect facial data transmitted from the user's computing device;
      performing facial recognition processing on the suspect facial data to establish suspect facial recognition data;
      comparing the suspect facial recognition data to pre-existing information stored in a database to identify a suspect match wherein if there is a determination, personal information of an identified suspect is transmitted wherein if there is no determination a notification displaying no match is transmitted;
      storing one or more trespass statements in the one or more databases, the one or more trespass statements having information pertaining to criminal or civil laws;
      transmitting the one or more trespass statements to the user's computing device for display; and
      automatically recording video when the one or more trespass statements is displayed.

2. The suspect identification system of claim 1 wherein the instructions are executed by the at least one computing device to further perform: creating an incident report, the incident report comprising the suspect facial recognition data and details related to the incident, and to store the incident report and the recorded trespass statement in the one or more databases.

3. The suspect identification system of claim 2, wherein the instructions are executed by the at least one computing device to further perform:
   generating suspect operational metadata corresponding to the suspect facial recognition data; and
   transmitting the suspect operational metadata, wherein the suspect operational metadata includes a timestamp and a geographical location corresponding to the image of the suspect captured on the user's computing device, wherein the geographical location is obtained from a global positioning system (GPS) on the user's computing device.

4. The suspect identification system of claim 3, wherein the instructions are executed by the at least one computing device to further perform:

generating suspect history by providing the incident report, wherein the suspect history comprises previous incidents related to the suspect.

5. The suspect identification system of claim 4, the incident report further comprising the timestamp and geographic location of the previous incidents.

6. The suspect identification system of claim 5, wherein the instructions are executed by the at least one computing device to further perform:

generating a virtual map wherein the previous incident reports are displayed as identifiers at their respective locations of occurrence.

7. The suspect identification system of claim 4, wherein the instructions are executed by the at least one computing device to further perform:

generating search results based on input by the user, wherein the input comprises a name of the suspect, the image of the suspect, and the previous incidents related to the suspect.

8. The suspect identification system of claim 1, wherein the instructions are executed by the at least one computing device to further perform:

generating audio utilizing statistical language models to generate candidate text interpretation of the one or more trespass statements; and playing the audio generated.

9. The suspect identification system of claim 1, wherein the instructions are executed by the at least one computing device to further perform: receiving input from the user's computing device pertaining to a crime being committed; and transmitting one or more criminal or civil codes in response to the input.

10. A suspect identification system comprising:

one or more databases coupled via a network;

one or more processors coupled to the one or more databases; and at least one computing device coupled to the one or more processors and the one or more databases via the network, wherein instructions are executed by the at least one computing device to perform:

generating suspect facial data from an image of a suspect captured on a user's computing device;

receiving the suspect facial data transmitted from the user's computing device;

performing facial recognition processing on the suspect facial data to establish suspect facial recognition data;

comparing the suspect facial recognition data to pre-existing information stored in a database to identify a suspect match wherein if there is a determination, personal information of an identified suspect is transmitted wherein if there is no determination a notification displaying no match is transmitted;

storing one or more trespass statements in the one or more databases, the one or more trespass statements having information pertaining to criminal or civil laws;

automatically recording video when the one or more trespass statements is displayed;

transmitting the one or more trespass statements to the user's computing device for display; and transmitting one or more parts of the one or more trespass statements in a specific language in response to a received location of the user's computing device.

11. A suspect identification system comprising:

one or more databases coupled via a network;

one or more processors coupled to the one or more databases; and at least one computing device coupled to the one or more processors and the one or more databases via the network, wherein instructions are executed by the at least one computing device to perform:

generating suspect facial data from an image of a suspect captured on a user's computing device;

receiving the suspect facial data transmitted from the user's computing device;

performing facial recognition processing on the suspect facial data to establish suspect facial recognition data;

comparing the suspect facial recognition data to pre-existing information stored in a database to identify a suspect match wherein if there is a determination, personal information of an identified suspect is transmitted wherein if there is no determination a notification displaying no match is transmitted;

storing one or more trespass statements pertaining to multiple regions in the one or more databases, a specific trespass statement of the one or more trespass statements pertaining to criminal or civil laws of a specific region;

determining the specific region that a user is located in in response to a received location of the user's computing device; and transmitting the specific trespass statement of the one or more trespass statements in response to the specific region.

12. The suspect identification system of claim 11 wherein the instructions are executed by the at least one computing device to further perform:

determining a language of the specific region; and transmitting one or more parts of the one or more trespass statements in a specific language in response to the determination.

13. The suspect identification system of claim 11: wherein the instructions are executed by the at least one computing device to further perform:

automatically recording video when the one or more trespass statements is displayed.

* * * * *